May 29, 1934.  C. E. RIDGWAY  1,960,510
HEAT ECONOMIZER
Filed March 24, 1933   3 Sheets-Sheet 1
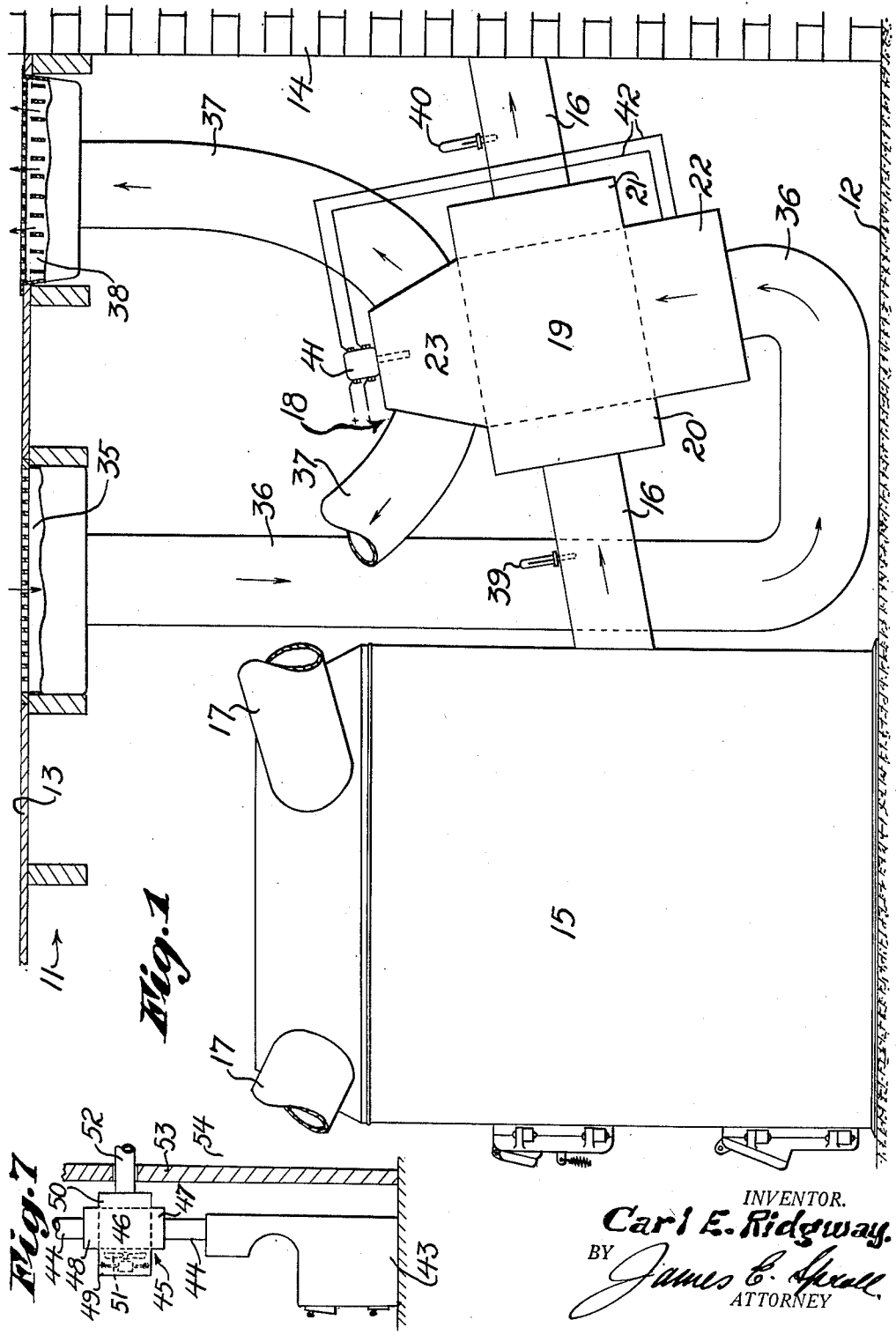
INVENTOR.
Carl E. Ridgway.
BY
James E. Sprull
ATTORNEY

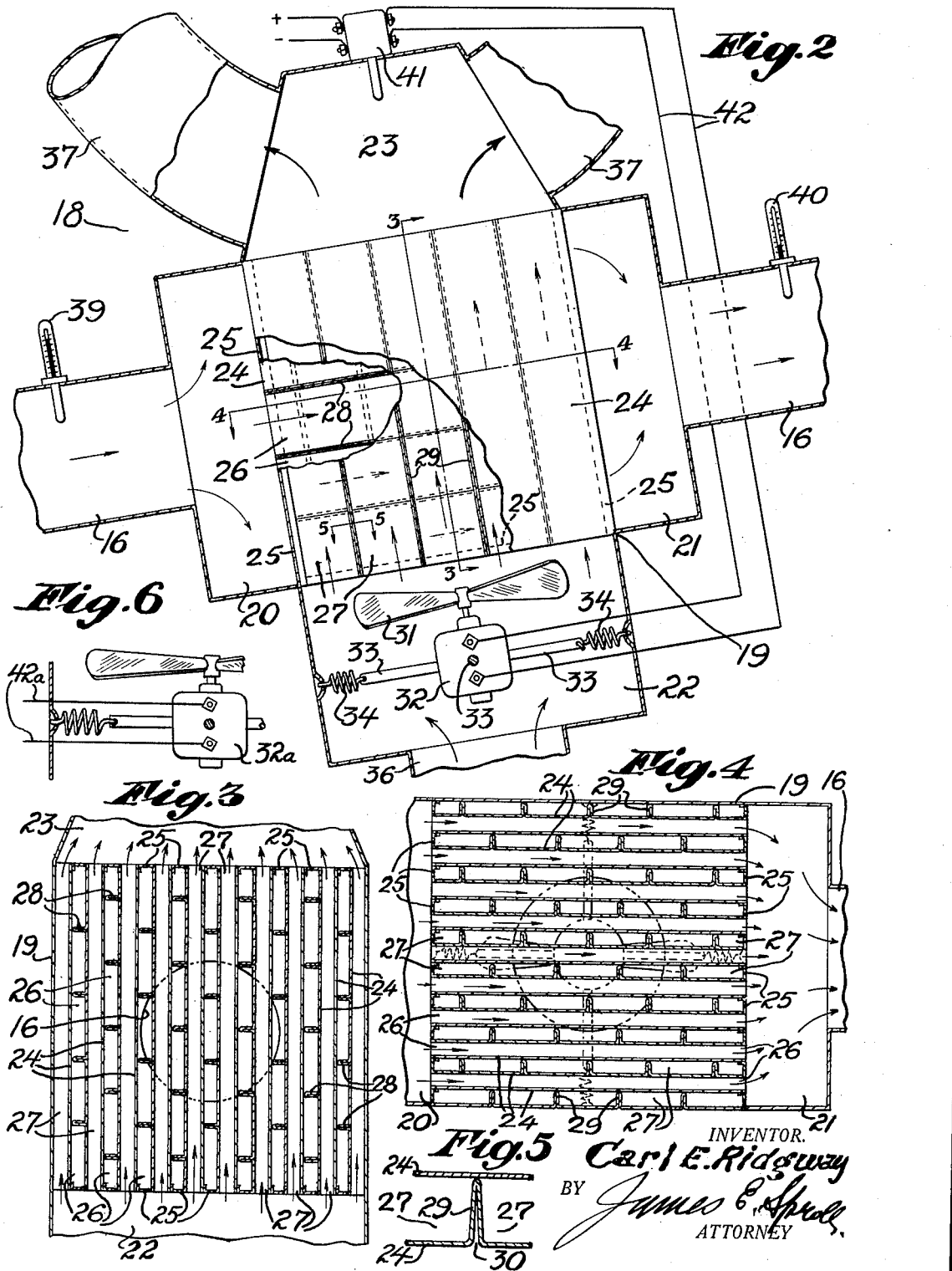

May 29, 1934.     C. E. RIDGWAY     1,960,510
HEAT ECONOMIZER
Filed March 24, 1933     3 Sheets-Sheet 3
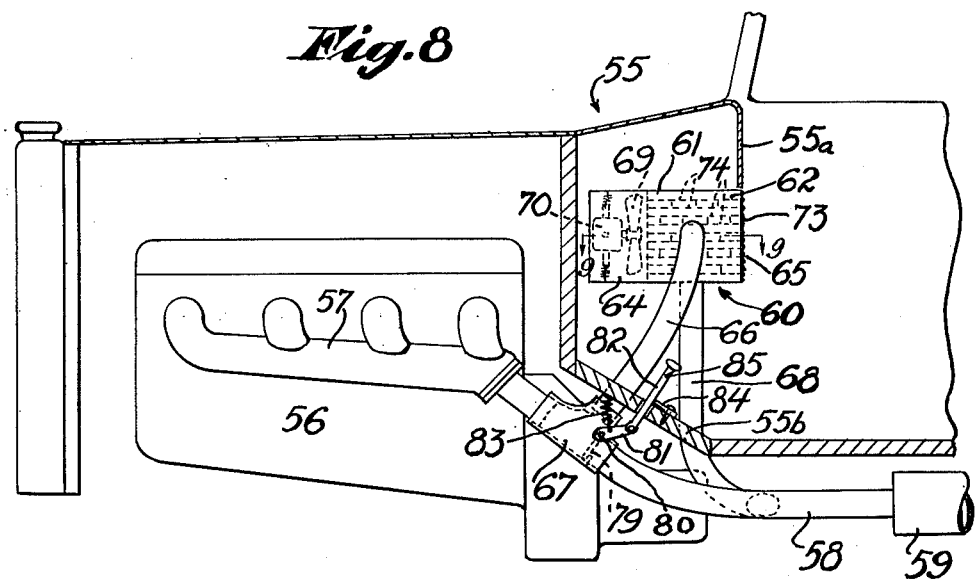
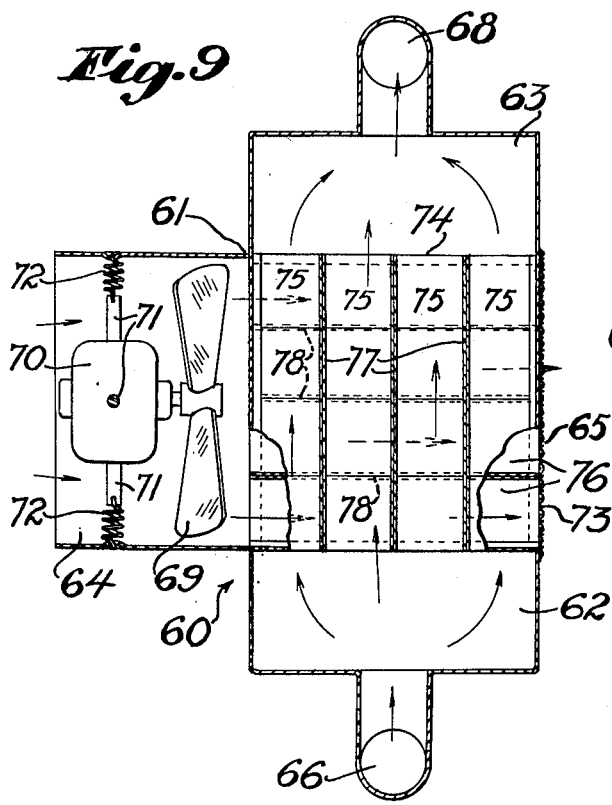
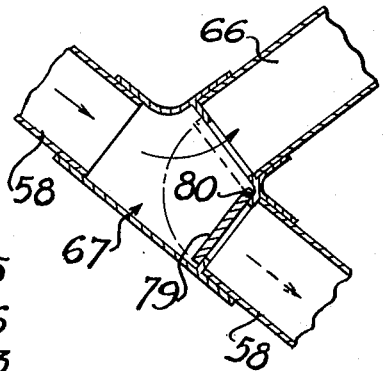
INVENTOR.
Carl E. Ridgway.
BY James B. Groll
ATTORNEY.

Patented May 29, 1934

1,960,510

UNITED STATES PATENT OFFICE 1,960,510

HEAT ECONOMIZER

Carl E. Ridgway, Seattle, Wash.

Application March 24, 1933, Serial No. 662,596

5 Claims. (Cl. 257—245)

This invention relates to heat economizers and aims primarily to provide a heat economizer especially designed and adaptable to be interposed within a conduit for conveying combustion gases to the outer air, within which economizer the combustion gases are spread or expanded and are caused to pass therethrough in relatively thin layers and within which air to be heated is also spread or expanded and is caused to pass therethrough in similar alternate layers in a direction substantially perpendicular to the direction of flow of the combustion gases, whereby such layers of moving air extract substantially all of the heat from said combustion gases and the latter pass to the atmosphere at a materially reduced temperature.

Contemplated, therefore, by the present invention is a heat economizer, which in its preferred embodiment is characterized by the employment of a casing having inlet and outlet openings for the hot gases and inlet and outlet openings for the air or other gas to be heated, a plurality of relatively thin plates disposed in close spaced parallel relation within said casing and interconnected in such a manner as to form a series of passageways for the hot gases communicating with the inlet and outlet openings therefor and a series of passageways for the air or other gas to be heated communicating with the inlet and outlet openings therefor, said air passageways being disposed in alternate relation to and sealed from said passageways for the hot gases, means on said plates for preventing warping of same and for spreading the hot gases and air in their respective passageways, and means for circulating the air through the economizer, all of which are important elements and features of the invention and are to be correlated in the broad aim of enhancing the efficiency of the same, for the uses and purposes for which it is primarily designed and intended.

The above, and additional objects which will hereinafter be more specifically treated are attained by such means as are shown in the accompanying drawings, described in the following specification and then more clearly pointed out in the claims which are appended hereto and form part of this application.

With reference to the drawings, in which there are illustrated several embodiments of the invention, and throughout the several views of which like characters of reference designate similar parts:

Figure 1 is a side elevation of a heating plant or furnace equipped with a heat economizer comprehended by the present invention, said heating plant being illustrated as it would appear when installed within a building basement with the first floor thereof and the air inlet register and air outlet register of said heat economizer shown in section.

Fig. 2 is an enlarged vertical longitudinal section of the heat economizer, with certain parts being broken away and certain other parts shown in section for clarity of illustration.

Fig. 3 is a fragmentary vertical transverse section of same taken through 3—3 of Fig. 2.

Fig. 4 is a fragmentary horizontal longitudinal section thereof taken through 4—4 of Fig. 2.

Fig. 5 is an enlarged fragmentary transverse section of an expansion and spreader vane of the economizer, taken through 5—5 of Fig. 2.

Fig. 6 is a fragmentary vertical longitudinal section, illustrating a slightly modified type of wiring for the circulating fan motor.

Fig. 7 is an end elevation of a range or stove, the flue pipe of which is equipped with a heat economizer fabricated in accordance with the present invention.

Fig. 8 is a fragmentary vertical longitudinal section of the forward end of an automotive vehicle, the exhaust manifold of which is equipped with a heat economizer of the present invention.

Fig. 9 is a horizontal section of same taken through 9—9 of Fig. 8, certain parts thereof being broken away for clarity of illustration, and Fig. 10 is an enlarged fragmentary vertical longitudinal medial section of the by-pass valve interposed in the exhaust manifold.

Before taking up the detailed description of the drawings, a general exposition of the specific purposes, functions and advantages, of the heat economizer evolved by the present invention will be undertaken.

Heretofore, in all types of heating apparatus, whether steam, hot water, or hot air, and including ranges, stoves, gas, oil and electric heating devices, the efficiency of the same has often been relatively low compared with their possibilities for maximum heating effect, this being due principally to the fact that all of the hot gases and products of combustion are allowed to escape to the atmosphere without delivering up their full heating effect or values. A further disadvantage of and objection to the above mentioned apparatus or heaters was that the same heated by radiation, which fact materially reduced their efficiency. Furthermore, various heat economizers which have heretofore been devised for utilizing waste heat have in general been expensive in design and in installation and have not been adaptable to interchanging to the different types of heating apparatus or devices.

Wherefore, it is the primary object and purpose of the present invention to overcome all of these objections and disadvantages by providing a heat economizer that is adaptable for use with all types of heating apparatus or devices for utilizing the products of combustion or the heat therefrom which formerly was wasted and thereby materially increasing the efficiency of such apparatus or devices and substantially securing therefrom the maximum heating effect and values. Further, to provide a heat economizer that may be installed or interposed in a conduit for combustion gases, or that may be employed as the conduit itself for conveying the hot waste gases to the atmosphere and coincidentally therewith extract the heat therefrom.

Beginning now the more detailed description of the invention by reference to the accompanying drawings, and referring more particularly at this time to Figs. 1 to 4, inclusive the numeral 11 generally designates a building having a basement floor 12, a main or ground floor 13 and a chimney 14, which latter is adapted to be supported upon the foundation of the building and to extend upwardly through the main floor 13 of the same, substantially in the manner illustrated in Fig. 1.

Disposed upon the basement floor 12 is a furnace or heating plant 15 having a flue or smoke pipe 16 leading therefrom to the chimney 14, and also having hot air pipes 17 leading from the upper end thereof to the various rooms, not shown, of the building 11.

Interposed within the flue or smoke pipe 16, at any desired point therein between the chimney 14 and the furnace 15, is the heat economizer evolved by the present invention, and herein generally designated by the numeral 18, which economizer comprises a casing 19 provided at its ends with inlet and outlet headers 20 and 21 connected to the flue 16 for effecting passage of the combustion gases therethrough, and also provided with bottom and top headers 22 and 23 for effecting passage through the economizer of the air to be heated.

Disposed in close uniform spaced parallel relation within the casing 19, between the headers 20 to 23, inclusive, is a plurality or series of relatively thin rectangular plates 24 having two of their oppositely disposed edges return bent to form opposing channel portions 25 thereof, see Figs. 3 and 4. The plates 24 are all alike and are adapted to be rigidly interconnected, as by welding, and for this purpose are assembled in the following described manner, alternate plates of the series have their opposing channel portions 25 running in the same direction with the flanges of said channel portions welded or otherwise rigidly secured and sealed to the adjacent faces and free edge portions of the intervening or intermediate plates, to thereby form and provide a series of passageways or compartments 26 therebetween, for conveying the combustion gases from their inlet header 20 to their outlet header 21, see Fig. 3, while said intervening or intermediate plates have their opposing channel portions 25 running in a direction perpendicular to the channel portions 25 of said alternate plates with the flanges thereof welded and sealed to the adjacent faces and free edge portions of the alternate plates, to thereby form and provide a series of passageways or compartments 27 therebetween for conveying the air to be heated from its inlet header 22 to its outlet header 23, see Fig. 4.

To more effectively spread the combustion or hot gases and the air to be heated within their respective passageways 26 and 27, and to also compensate for the expansion of the plates 24 and thus more effectually and positively prevent warping of the latter when heated, said passageways 26 for the combustion gases are provided with a series of spaced parallel expansion and gas spreader vanes 28, which in the present instance are formed by return bending the material of the alternate plates, at suitable intervals, in such a manner, that said vanes 28 are parallel to and run in the same direction as the channel portions 25 thereof, see Fig. 3, while the air passageways 27 are similarly provided with a series of spaced parallel expansion and air spreader vanes 29 formed by return bending the material of the intervening plates, at suitable intervals, so that said vanes 29 are parallel to and run in the same direction as the channel portions 25 of same, see Fig. 4. In forming the return bent vanes 28 and 29, upon the plates 24, it has been found highly expedient and advantageous in practice, to flare same outwardly, as shown at 30, in Fig. 5, which flaring vanes readily absorb and take up the expansion of their correlated plates, as will be manifest and apparent. As hereinbefore stated the plates 24 are interconnected in such a manner to form gastight joints therebetween and thereby positively seal the combustion gas passageways 26 from the air passageways 27, so that the air passing through the latter will not become contaminated or fouled by or from the combustion gases.

Mounted within the air inlet header 22 is an air circulating fan 31 adapted to be driven by an electric motor 32 having arms 33 extending radially therefrom and at their outer ends are connected to the side walls of the header 22, as by springs 34, this for the purpose of materially reducing or minimizing vibration of the motor 32, as will be obvious and apparent.

The numeral 35 designates a cold air inlet register, mounted within the floor 13, from which downwardly depends or extends an air supply conduit 36 connected at its lower or opposite terminal to the air inlet header 22 of the heat economizer. Connected to and leading from the air outlet header 23 of said economizer are a series of hot air supply pipes 37, one of which is shown as leading to a hot air outlet register 38 mounted in the floor 13.

Operatively mounted upon and extending within the flue or smoke pipe 16 at a point between the furnace 15 and the heat economizer 18 is a stack thermometer 39 and similarly mounted in the flue 16 between the economizer and the chimney 14 is a second stack thermometer 40, which thermometers are provided for the purpose of checking and noting the temperature of the combustion gases prior to their passing into the economizer and the temperature of same after passing therefrom.

In order to substantially secure immediate circulation of the air through the economizer, when solid fuel is being used in the furnace 15 I provide and mount upon the air outlet header 23 of the economizer to extend therein a thermostatic switch 41, which latter is interposed within the wiring circuit 42 of the motor 32, substantially in the manner more clearly illustrated in Fig. 2, whereby said circuit is closed when the air in the outlet header 23 reaches a predetermined temperature.

In Fig. 6 I have illustrated a slightly modified type of wiring for the circulating fan motor therein designated by the numeral 32a, which type is especially designed and primarily intended for use with oil burning furnaces, the motor leads 42a in this type being connected to the switch, not shown, of the oil burner motor, so that the latter and the circulating fan motor 32a are started simultaneously and air commences to circulate through the economizer immediately upon starting the oil burning furnace, not shown. In this connection, it may be well to state, that, heretofore, with solid or oil fuel burning furnaces not equipped with the present novel heat economizer considerable time elapsed before heat was available or furnished to the rooms.

In the operation of the present heat economizer the combustion gases immediately upon entering the same are spread and expanded into the passageways 26 by the spreaders or vanes 28 therein and during their passage therethrough distribute their heat over the entire surfaces or area of the walls of said passageways. Similarly the relatively cold air entering the economizer is circulated by the fan 31 and is spread or expanded into the passageways 27 by the spreaders or vanes 29 therein and during its passage therethrough contacts the entire surface or area of the heated walls of said passageways and extracts substantially all of the heat therefrom, following which such heated air passes from the economizer into the hot air pipes 37 and thence to the rooms to be heated.

In Fig. 7 I have illustrated a slightly modified type of heat economizer especially designed and adapted for use with ranges or stoves, and wherein the numeral 43 designates a range or stove, of any well known type, having a flue or smoke pipe 44 within which is interposed the slightly modified type of heat economizer herein generally designated by the numeral 45, said economizer comprising a casing 46 having inlet and outlet headers 47 and 48 for the combustion gases which are accordingly connected to the flue 44, as shown, said casing also having air inlet and outlet headers 49 and 50. The casing 46 is equipped or provided with passageways, not shown, for the combustion gases and air identical to that hereinbefore described for the casing 19. Mounted within the air inlet header 49, which in the present instance is open at its outer end, is an electric circulating fan 51, and connected to and leading from the air outlet header 50 is a hot air supply pipe 52, which extends from said header through a wall or partition 53 into a room 54 to heat the same when the electric fan 51 is operating.

In Figs. 8 to 10, inclusive, I have illustrated another slightly modified type of heat economizer especially designed and adapted for use in heating automotive vehicles, and wherein the numeral 55 generally designates an automotive vehicle of any well known type, 56 the engine, 57 the exhaust manifold, 58 the exhaust pipe and 59 the muffler of same.

Interposed within the exhaust pipe 58 between the manifold 57 and the muffler 59 is another slightly modified type of heat economizer herein generally designated by the numeral 60 and wherethrough the combustion gases from said manifold 57 are adapted to be selectively bypassed, said economizer, in the present instance, being preferably and normally disposed or located beneath and slightly forwardly of the vehicle cowl or dash 55a, substantially in the manner shown in Fig. 8.

The heat economizer 60 comprises a casing 61 having inlet and outlet headers 62 and 63 for the combustion gases and a cold air inlet header 64 and a hot air outlet 65. The inlet header 62 for the combustion gases is connected by a pipe or conduit 66 and a bypass valve 67 to the exhaust pipe 58, and for this purpose said pipe 66 extends downwardly from the economizer 60 through the vehicle floor board 55b, whereat it is connected to the bypass valve 67, which latter is interposed in said exhaust pipe 58, all as clearly illustrated in Fig. 8. The outlet header 63 for the combustion gases is connected by a pipe or conduit 68 to the exhaust pipe 58, at a point thereon intermediate the bypass valve 67 and the muffler 59, and for this purpose also extends downwardly from the economizer through the vehicle floor board 55b, as shown in Fig. 8.

The cold air inlet header 64 in the present instance is preferably located or disposed at the forward or front end of the heat economizer 60, as shown in Figs. 8 and 9, and mounted within said air inlet header, which as now constructed is open at its outer or forward end see Fig. 9, is a circulating fan 69 adapted to be driven by an electric motor 70 having arms 71 extending radially therefrom and at their outer ends are connected to the side walls of the header 64, as by springs 72. The motor 70 is connected in any well known manner to the vehicle battery, not shown, or to any other suitable source of electrical energy carried by the vehicle 55. The hot air outlet 65 of the slightly modified type of heat economizer 60 is flush with the rear wall of the latter, see Figs. 8 and 9, and may be provided thereat if desired with a wire mesh screen or grid 73, to prevent any refuse entering the economizer.

Disposed in close spaced parallel relation within the casing 61 between the headers 62, 63, 64 and the hot air outlet 65 is a plurality of plates 74, which are fabricated and interconnected in the identical manner to that hereinbefore described for the plates 24, to form passageways 75 and 76 therebetween for the combustion gases and air to be heated, said passageways 75 having expansion and gas spreader vanes 77 formed in spaced parallel relation upon alternate plates 74, while said passageways 76 are also provided with expansion and air spreader vanes 78, which are similarly formed, in perpendicular relation to the vanes 77, upon the plates 74 intermediate said alternate plates. The plates 74 are connected or welded to each other and to the economizer casing 61, in the same manner as hereinbefore described for the plates 24, to form gas-tight joints therebetween, so that the air passing through the economizer will not be contaminated or fouled by the combustion gases.

The bypass valve 67 is provided with a flap valve 79 mounted upon a transversely disposed hinge or pivot pin 80, one end of which is adapted to project through the valve casing, as shown in Fig. 8, and fixedly secured to the projecting end of said pin is an arm 81, the outer end of which is pivotally connected to the lower end of a foot actuated pedal or bar 82, which extends upwardly through the vehicle floor board 55b at a point therein readily and conveniently accessible to the foot of the vehicle operator. The flap valve 79 is maintained upon its seat in a bypass or depressed position, shown in dotted lines in Fig. 8 and in full lines in Fig. 10, by a tension spring 83 connected at one end to the bottom of the floor board 55b and at its other end to the arm 81, and in addition to said spring by the pressure of the bypassed gases impinging upon said valve. To maintain the flap valve 79 upon its seat in a non-bypass or elevated position I provide a catch 84 which is fixedly secured to the upper face of the floor board 55b and is adapted to engage a notch 85 in the foot actuated pedal 82, when the latter is depressed.

In the operation of the modified type of heat economizer 60, with the flap valve 79 in the full line depressed position illustrated in Fig. 10, the combustion gases pass upwardly through the bypass pipe 66 into the inlet header 62, thence through the passageways 75 heating the walls or plates 74 of the same, and from said passageways said gases pass into the outlet header 63, thence downwardly therefrom through the pipe 68 to return the exhaust pipe 58, the air to be heated enters the cold air inlet header 64 and is circulated by the fan 69 through the passageways 76, wherein the air extracts substantially all of the heat from the plates 74, following which the heated air passes rearwardly through the hot air outlet 65 to the interior of the vehicle 55. To shut off the heat economizer the vehicle operator depresses the foot actuated pedal 82 thereby elevating the flap valve 79 and closing off the bypass conduit 66 and permitting the combustion gases to pass directly from the manifold 57 to the muffler 59.

In the appended claims the term "flue" is to be construed in its broadest sense and to include conduits of all kinds for carrying off the products of combustion from heating and cooking apparatus, gas or oil burners, or from any heating devices wherein the present heat economizer may be used as the conduit thereof.

Actual experience and extensive use of the present heat economizer has shown and demonstrated that the combustion gases upon leaving the economizer are materially reduced in temperature, thereby reducing fire hazards and danger from overheated flues, and further that heat is made instantly available and the circulation of the hot air in the rooms heated by the present economizer is vastly improved, inasmuch as the circulating fan insures positive circulation and effectually prevents overheating or scorching of the air and the devitalizing of the same. Actual experience and use of the present heat economizer has also shown that fuel consumption is greatly reduced, in some instances to approximately forty or fifty percent, and in addition to such reduction more rooms were heated by the heat formerly lost by passing to the atmosphere.

Manifestly, therefore, the heat economizer of the present invention is simple, compact, durable and economical in construction, is rapidly and readily installed, is positive and efficient in operation, and heats by convection rather than by radiation.

While, I have herein shown and described the invention with sufficient detail, to enable those skilled in the art to which it pertains, to understand the mode of construction and the principles involved, it is to be understood that there is no intentional limitation herein to the specific form and precise details of construction shown and described, except as expressly defined by the appended claims, and that various modifications of the same may be resorted to without departing from the spirit of the invention or the benefits derivable therefrom. It is also to be understood that certain features of the invention herein disclosed may be employed in and with combinations other than those shown and described, the present showing being merely by way of illustration.

Having thus described my invention, what I claim as new and desire to secure by Letters Patent is:—

1. In a heat transfer unit, the combination of a plurality of plates having oppositely disposed edges return bent to form channel portions thereat, said plates being interconnected at said channel portions with the channels of alternate plates running in the same direction and the channels of the intervening plates running in a direction substantially perpendicular to those of said alternate plates, to thereby provide a series of passageways for hot gases and a series of alternate passageways for air to be heated.

2. In a heat transfer unit, the combination of a plurality of rectangular plates of relatively thin material having their ends return bent to form channel portions thereat, said plates being interconnected in sealed relation at said channel portions, with the channels of alternate plates running in the same direction and the channels of the intervening plates running in a direction substantially perpendicular to those of said alternate plates, to thereby provide within said unit a series of passageways for hot gases and a series of alternate passageways for air to be heated, and a series of vanes on each of said plates disposed in spaced parallel relation to the channels thereof and in similar relation to each other.

3. In a heat transfer unit, the combination of a plurality of plates of relatively thin material return bent at their oppositely disposed edges to form channel portions thereat and also return bent at spaced intervals to form vanes thereon in parallel relation to said channels, said plates being interconnected in sealed relation at their channelled terminals, with the channels of alternate plates running in the same direction and the channels of the intervening plates running in a direction substantially at right angles to those of said alternate plates, to thereby provide within said unit a series of passageways for hot gases and a series of alternate passageways for air to be heated.

4. In a heat transfer unit, the combination of a plurality of relatively thin plates having oppositely disposed edges return bent to form channel portions thereat and being interconnected at said channel portions, with the channels of alternate plates running in the same direction and the channels of the intervening plates running in a direction substantially perpendicular to those of said alternate plates, to thereby provide a series of passageways for hot gases and a series of alternate passageways for air to be heated, said plates also having the material thereof return bent at spaced intervals to form vanes thereon in parallel relation to their channel portions, with the vanes in alternate hot gas passageways disposed in staggered relation to the vanes in the other hot gas passageways and with the vanes in alternate air passageways similarly disposed.

5. In a heat economizer, in combination, a casing having inlet and outlet headers for hot gases and inlet and outlet headers for air to be heated, means for conducting hot gases to and from said first mentioned headers, means for conducting air to and from said second mentioned headers, a heat transfer unit disposed within said casing between said headers having a plurality of rectangular plates of relatively thin material return bent at their ends to form channel portions thereat, said plates being interconnected in sealed relation at said channel portions, with the channels of alternate plates extending between the inlet and outlet headers for the hot gases and the channels of the intervening plates extending between the air inlet and outlet headers to thereby provide a series of passageways for hot gases between the headers thereof and a series of alternate passageways for air between the headers thereof, a series of spreader vanes on each of said plates disposed in spaced parallel relation to the channels thereof and in similar relation to each other, and an air circulating fan mounted within the air inlet header for effecting circulation of air through said air passageways.

CARL E. RIDGWAY.